(12) United States Patent
Kanno

(10) Patent No.: US 8,716,900 B2
(45) Date of Patent: May 6, 2014

(54) WIRELESS POWER TRANSMISSION SYSTEM

(75) Inventor: Hiroshi Kanno, Osaka (JP)

(73) Assignee: Panasonic Corporation, Osaka (JP)

( * ) Notice: Subject to any disclaimer, the term of this patent is extended or adjusted under 35 U.S.C. 154(b) by 523 days.

(21) Appl. No.: 13/075,096

(22) Filed: Mar. 29, 2011

(65) Prior Publication Data
US 2011/0241437 A1 Oct. 6, 2011

Related U.S. Application Data

(60) Provisional application No. 61/318,807, filed on Mar. 30, 2010.

(51) Int. Cl.
*H01F 38/14* (2006.01)
*H01F 21/00* (2006.01)
*H02J 17/00* (2006.01)

(52) U.S. Cl.
CPC ............. *H01F 38/14* (2013.01); *H01F 21/00* (2013.01); *H02J 17/00* (2013.01)
USPC ......................................................... 307/104

(58) Field of Classification Search
CPC ........... H01F 21/00; H01F 38/14; H02J 17/00
USPC ......................................................... 307/104
See application file for complete search history.

(56) References Cited

U.S. PATENT DOCUMENTS

| | | | |
|---|---|---|---|
| 6,649,842 B1 | 11/2003 | Nishino | |
| 7,212,414 B2 * | 5/2007 | Baarman | 363/16 |
| 2002/0017980 A1 | 2/2002 | Uozumi | |

(Continued)

FOREIGN PATENT DOCUMENTS

| | | |
|---|---|---|
| JP | 08-175232 | 7/1996 |
| JP | 2001-344574 | 12/2001 |

(Continued)

OTHER PUBLICATIONS

International Search Report for corresponding International Application No. PCT/JP2011/001867 mailed Jun. 14, 2011.

(Continued)

*Primary Examiner* — Hal Kaplan
(74) *Attorney, Agent, or Firm* — Renner, Otto, Boisselle & Sklar, LLP

(57) ABSTRACT

The wireless power transmission system of this invention transmits power over a resonant magnetic field. The system includes a power-transmitting resonator 105 and a power-receiving resonator 107, at least one of which is a series resonant circuit with an inductor including spiral wiring 201 and extended wires 213, 207a, 207b and 207c. The extended wire 213 connects a point 203 of the spiral wiring 201 to a power supplying structure, while the extended wires 207a, 207b and 207c connect other points of the spiral wiring 201 to the power supplying structure. Capacitors 209a, 209b and 209c and switches 211a, 211b and 211c are connected to the extended wires 207a, 207b and 207c, respectively. The series resonant circuit has its inductance varied according to which current path has been chosen by selectively turning ON one of the switches. A wiring portion 201a of the spiral wiring 201 has a low-resistance portion 2010, of which the wiring resistance per unit length at a resonant frequency is set to be lower than in at least a part of the rest of the spiral wiring.

20 Claims, 10 Drawing Sheets

(56) References Cited

U.S. PATENT DOCUMENTS

2007/0115086 A1     5/2007    Cairo Molins
2008/0278264 A1    11/2008    Karalis et al.
2011/0025132 A1*    2/2011    Sato .............................. 307/104

FOREIGN PATENT DOCUMENTS

| | | |
|---|---|---|
| JP | 2007-142418 | 6/2007 |
| JP | 2008-206327 | 9/2008 |
| JP | 2009-125097 A | 6/2009 |
| JP | 2009-268181 A | 11/2009 |
| WO | 2004/073150 | 8/2004 |

OTHER PUBLICATIONS

Form PCT/ISA/237 for corresponding International Application No. PCT/JP2011/001867 dated Jun. 14, 2011.

\* cited by examiner

WIRELESS POWER TRANSMISSION SYSTEM

This application claims priority under 35 USC §119(e) to U.S. Provisional Application No. 61/318,807 filed on Mar. 30, 2010, the entire contents of which are incorporated herein by reference.

BACKGROUND OF THE INVENTION

1. Field of the Invention

The present invention relates to a wireless power transmission system for transferring energy in order to charge a device with electric power or supply or collect electric power to/from a device and also relates to a wireless power transmission unit for use in such a system.

2. Description of the Related Art

Wireless energy transfer technologies have attracted increasing attention these days in order to increase the mobility and water resistance of various electronic devices as much as possible; realize a wireless wall-mounted TV monitor; and charge and supply power to a big moving object such as an electric vehicle.

As a novel non-contact power transmission method that would replace the conventional one that uses electromagnetic induction, a resonant magnetic coupling method has been proposed in United States Patent Application Laid-Open Publication No. 2008/0278264-A1, for example (see FIGS. 6 and 31). According to such a method, resonant mode coupling between resonant antennas is used to realize longer range and higher efficiency power transmission than the conventional electromagnetic induction method. It is thought that particularly if a resonant magnetic field is used, influence on surrounding organisms would be reduced compared to a situation where a resonant electric field is used.

The resonant magnetic coupling method will be described in further detail. As disclosed in Paragraph #0033 of the description of United States Patent Application Laid-Open Publication No. 2008/0278264, the self-resonance phenomenon, which is unique to a loop coil with two open ends, may be used to form a resonator. Alternatively, as disclosed in Paragraph #0038 of that US patent application publication, the resonator may also be formed as a coil loaded with a capacitor. Such a resonant magnetic coupling power transmission system may be regarded as an electromagnetic induction system that does not have a coupling coefficient k of one and yet has its transmission efficiency increased by using a high-Q circuit. Nevertheless, since the coupling coefficient is low (k≠1), high-efficiency energy transfer cannot be realized unless impedance matching is maintained between the power transmitter and the power transmitting resonator, and between the power receiver and the power receiving resonator, which is a restriction that is not imposed on the electromagnetic induction method in which k≈1.

On the other hand, there are many electronic devices or appliances to be driven with a constant voltage, even though that is not the case with some other devices (such as optical devices) that operate in a constant current mode. Likewise, the majority of AC outlets and power supply circuits such as solar cells and fuel cells supply an almost constant voltage. That is why if such a resonant magnetic coupling energy transfer system could be modified so as to cope with a variation in impedance, that system would be applicable to a lot of power sources and a lot of loads. For that purpose, it is preferred that the power transmitting block and power receiving block also have the ability to cope with an impedance variation. To realize that, a wireless section that includes at least a pair of resonators should have variable functions that would allow the system to not only cope with the impedance variation but also maintain the high efficiency transmission ability on a situation basis.

Meanwhile, Japanese Patent Application Laid-Open Publication No. 2007-142418 (see FIG. 3, in particular) discloses an exemplary configuration for a variable inductor.

Furthermore, Japanese Patent Application Laid-Open Publication No. 2001-344574 (see FIG. 3, in particular) discloses a configuration for a variable resonator that achieves a variable resonant frequency characteristic by selecting one of a group of capacitors with mutually different capacitances, which are arranged in parallel with each other, as the one to be connected to an inductor.

However, if the system is tentatively designed so as to cope with those multiple different operating conditions at the same time, it is still difficult to maintain expected high transmission efficiency. Nevertheless, to avoid such a difficulty, the overall length of wiring used should be increased. To overcome such problems with a resonant magnetic coupling wireless power transmission system, a variable resonator, including a variable inductor circuit, is introduced according to the present invention.

It is therefore an object of the present invention to provide a wireless power transmission system that can maintain as high transmission efficiency as possible even under the multiple conditions without unwanted increase of the overall length of wiring.

SUMMARY OF THE INVENTION

A wireless power transmission system according to the present invention is designed to transmit power over a resonant magnetic field. The system includes a power-transmitting resonator and a power-receiving resonator. At least one of the power-transmitting resonator and the power-receiving resonator is a series resonant circuit. The series resonant circuit includes an inductor including spiral wiring and first, second and third extended wires. The first extended wire connects a first connection point of the spiral wiring to a power supplying structure. The second extended wire connects a second connection point of the spiral wiring, which is different from the first connection point, to the power supplying structure. The third extended wire connects a third connection point of the spiral wiring, which is more distant from the first connection point than the second connection point is, to the power supplying structure. The series resonant circuit further includes: multiple switches, two of which are connected to the second and third extended wires, respectively; and multiple capacitors, each of which is connected in series to a corresponding one of the second and third extended wires by way of a corresponding one of the switches. The series resonant circuit has its inductance varied according to which current path has been chosen by selectively turning ON one of the switches. The capacitances of the capacitors are defined so that the series resonant circuit has a substantially same resonant frequency irrespective of what switch has been turned ON selectively. The spiral wiring has a low-resistance portion, which is located in a range from the second connection point through the first connection point and of which the wiring resistance per unit length at the resonant frequency is set to be lower than in at least a part of the other range of the spiral wiring.

In one preferred embodiment, the low-resistance portion has lower wiring resistance per unit length at the resonant frequency than any other portion of the spiral wiring.

In another preferred embodiment, the spiral wiring has a lower average wiring resistance at the resonant frequency in the range from the second connection point through the first connection point than outside of that range.

In still another preferred embodiment, the low-resistance portion of the spiral wiring has a structure in which a larger number of fine wires are arranged in parallel with each other than any other portion of the spiral wiring.

In yet another preferred embodiment, the low-resistance portion of the spiral wiring includes at least one fine wire that has a larger diameter than its counterpart in any other portion of the spiral wiring.

In yet another preferred embodiment, the low-resistance portion of the spiral wiring includes at least one fine wire that is thicker than its counterparts in any other portion of the spiral wiring.

In yet another preferred embodiment, the low-resistance portion of the spiral wiring includes at least one fine wire that is wider than its counterpart in any other portion of the spiral wiring.

In yet another preferred embodiment, the inductor further includes a fourth extended wire for connecting a fourth connection point, which is more distant from the second connection point of the spiral wiring than the first connection point is, to the power supplying structure, and each of the first and fourth extended wires is selectively connected to the power supplying structure by way of a different switch from the multiple switches.

In yet another preferred embodiment, if the series resonant circuit has the lowest possible one of its variable inductances, a portion of the spiral wiring that forms a current path is the innermost part of the spiral structure.

In yet another preferred embodiment, either the rating of the multiple switches or the gate width of transistors that function as the switches has its value varied according to the amount of current that flows through the switches in ON state.

In a specific preferred embodiment, one of the multiple switches that allows a larger amount of current to flow in ON state has a greater rating or a wider transistor gate width than another one of the switches that allows a smaller amount of current to flow in ON state.

In yet another preferred embodiment, if the series resonant circuit does not contribute to power transfer, the resonant frequency is changed into a different value by controlling the multiple switches.

In yet another preferred embodiment, the series resonant circuit is prevented from contributing to power transfer by turning every one of the switches ON.

In an alternative preferred embodiment, the series resonant circuit is prevented from contributing to power transfer by turning every one of the switches OFF.

In yet another preferred embodiment, the wireless power transmission system includes a power transmitter for supplying power to the power-transmitting resonator through the power supplying structure. And the optimum input impedance of the power-transmitting resonator that maximizes transmission efficiency between the power-transmitting and power-receiving resonators is matched to the output impedance of the power transmitter.

In yet another preferred embodiment, the wireless power transmission system includes a power receiver for receiving power from the power-receiving resonator through the power supplying structure. And the optimum output impedance of the power-receiving resonator that maximizes transmission efficiency between the power-transmitting and power-receiving resonators is matched to the input impedance of the power receiver.

In yet another preferred embodiment, the output impedance of the power receiver is matched to a load impedance.

In yet another preferred embodiment, the wireless power transmission system comprises an extended wire selecting section for selecting and turning ON one of the multiple switches.

In yet another preferred embodiment, the wireless power transmission system comprises a power transmitter for supplying power to the power-transmitting resonator through the power supplying structure, and a power receiver for receiving power from the power-receiving resonator through the power supplying structure. The extended wire selecting section selects and turns ON one of the multiple switches based on at least one of an output impedance of the power transmitter, an input impedance of the power receiver and a load impedance.

A wireless power transmission unit according to the present invention includes one of a power-transmitting resonator and a power-receiving resonator and transmits or receives power to/from the other resonator over a resonant magnetic field. The unit includes a series resonant circuit that functions as the power-transmitting resonator or the power-receiving resonator. The series resonant circuit includes an inductor including spiral wiring and first, second and third extended wires. The first extended wire connects a first connection point of the spiral wiring to a power supplying structure. The second extended wire connects a second connection point of the spiral wiring, which is different from the first connection point, to the power supplying structure. The third extended wire connects a third connection point of the spiral wiring, which is more distant from the first connection point than the second connection point is, to the power supplying structure. The series resonant circuit further includes: multiple switches, two of which are connected to the second and third extended wires, respectively; and multiple capacitors, each of which is connected in series to a corresponding one of the second and third extended wires by way of a corresponding one of the switches. The series resonant circuit has its inductance varied according to which current path has been chosen by selectively turning ON one of the switches. The capacitances of the capacitors are defined so that the series resonant circuit has a substantially same resonant frequency irrespective of what switch has been turned ON selectively. The spiral wiring has a low-resistance portion, which is located in a range from the second connection point through the first connection point and of which the wiring resistance per unit length at the resonant frequency is set to be lower than in at least a part of the other range of the spiral wiring.

A wireless power transmission system according to the present invention can avoid a decrease in wireless transmission efficiency in any state—including a low impedance transmission—while avoiding an increase in the overall length of wiring used.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
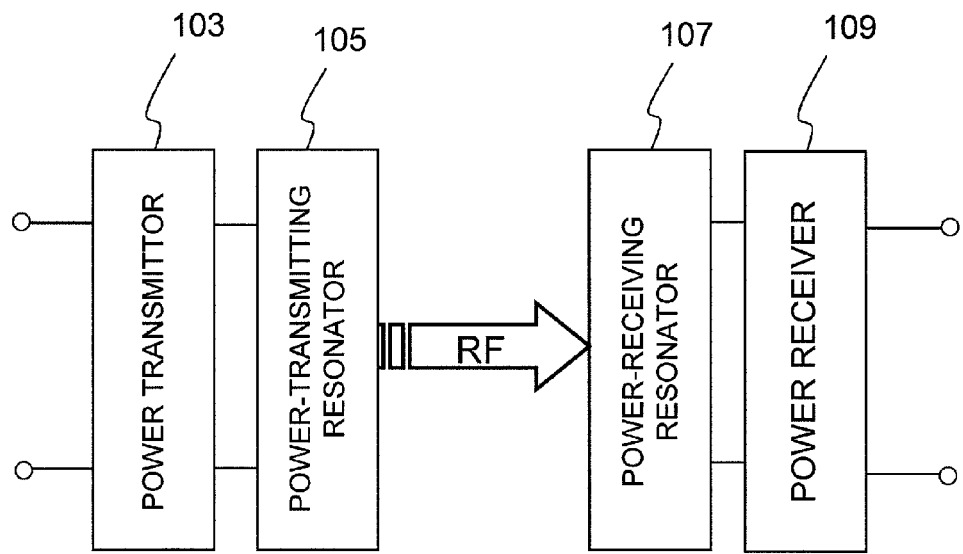
FIG. 1 is a block diagram illustrating a wireless power transmission system as a first specific preferred embodiment of the present invention.

Hereinafter, preferred embodiments of a wireless power transmission system according to the present invention will be described with reference to the accompanying drawings. In the XYZ coordinate system illustrated in some of the drawings, the plane on which an inductor that is one of the components that form the variable resonator is arranged is supposed to be the XY plane and the height direction of the inductor is supposed to be the Z direction. In the following description, any pair of components shown in multiple drawings and having substantially the same function will be identified by the same reference numeral.

Embodiment 1

FIG. 1 is a block diagram illustrating a configuration for a wireless power transmission system as a first specific preferred embodiment of the present invention.

As shown in FIG. 1, the Wireless Power Transmission system of this preferred embodiment includes a power-transmitting resonator 105 and a power-receiving resonator 107 and transmits power between the power-transmitting resonator 105 and the power-receiving resonator 107 over a resonant magnetic field. This wireless power transmission system is designed so that the power-transmitting resonator 105 and the power-receiving resonator 107 set up resonances at a frequency f0.

A power transmitter 103 is connected to the power-transmitting resonator 105. The power transmitter 103 receives DC or AC energy (electric energy) from a power supply (not shown; shown as power supply 101 in FIG. 7) and transforms the energy into RF energy with the frequency f0. The RF energy is sent out from the power transmitter 103 to the power-transmitting resonator 105. The power-transmitting resonator 105 and the power-receiving resonator 107, which are designed so as to produce resonances at the same frequency, are coupled together with a resonant magnetic field (with a resonant frequency f0). That is why the power-receiving resonator 107 can receive efficiently the RF energy that has been sent out by the power-transmitting resonator 105. As wireless power transmission is done using such a resonant magnetic field that oscillates at the resonant frequency f0, the resonant frequency f0 will sometimes be referred to herein as "transmission frequency".

Figure 2:
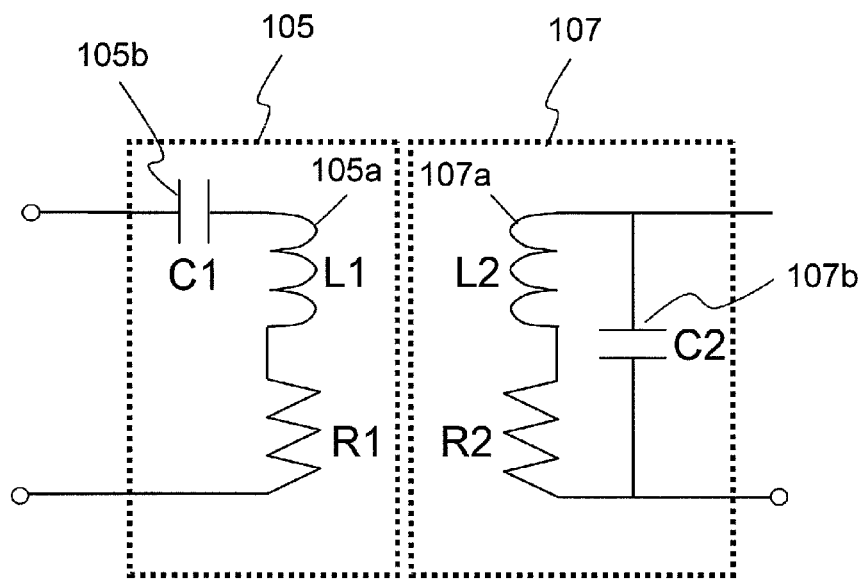
FIG. 2 illustrates a power-transmitting resonator and a power-receiving resonator according to the first preferred embodiment of the present invention.

Next, reference is made to FIG. 2 which illustrates an equivalent circuit for the power-transmitting resonator 105 and power-receiving resonator 107. In the example illustrated in FIG. 2, the power-transmitting resonator 105 is a series resonant circuit in which an inductor 105a and a capacitor 105b are connected together in series, while the power-receiving resonator 107 is a parallel resonant circuit in which an inductor 107a and a capacitor 107b are connected in parallel with each other. The series resonant circuit of the power-transmitting resonator 105 has a resistance component R1 and the parallel resonant circuit of the power-receiving resonator 107 has a resistance component R2.

In the example illustrated in FIG. 2, the power-transmitting resonator 105 is implemented as a series resonant circuit and the power-receiving resonator 107 is implemented as a parallel resonant circuit. However, the present invention is in no way limited to this specific example. Rather, either one, or even both, of the power-transmitting and power-receiving resonators 105 and 107 may be series resonant circuit(s).

The power-transmitting resonator 105 shown in FIG. 2 is a series resonant circuit, of which the inductor 105a and capacitor 105b have variable inductance L1 and variable capacitance C1, respectively. The series resonant circuit of this preferred embodiment is designed to be able to change the inductance L1 and capacitance C1 while keeping the resonant frequency f0 constant. Such a configuration will be described in detail later.

Thus, in the wireless power transmission system of this preferred embodiment, its series resonant circuit has variable inductance, and therefore, the system can readily cope with any impedance variation in the power source or in the load. As a result, this system is applicable to various power sources and loads. To give such a function of coping with an impedance variation to not only the power-transmitting block but also the power-receiving block, the power-receiving resonator 107, as well as the power-transmitting resonator 105, may be implemented as a series resonant circuit with variable impedance.

Hereinafter, a configuration for such a series resonant circuit with variable inductance according to this preferred embodiment (which will be referred to herein as a "variable resonant circuit") will be described in detail with reference to FIG. 3, which is a perspective view illustrating an exemplary configuration for a variable resonant circuit according to this preferred embodiment.

Figure 3:
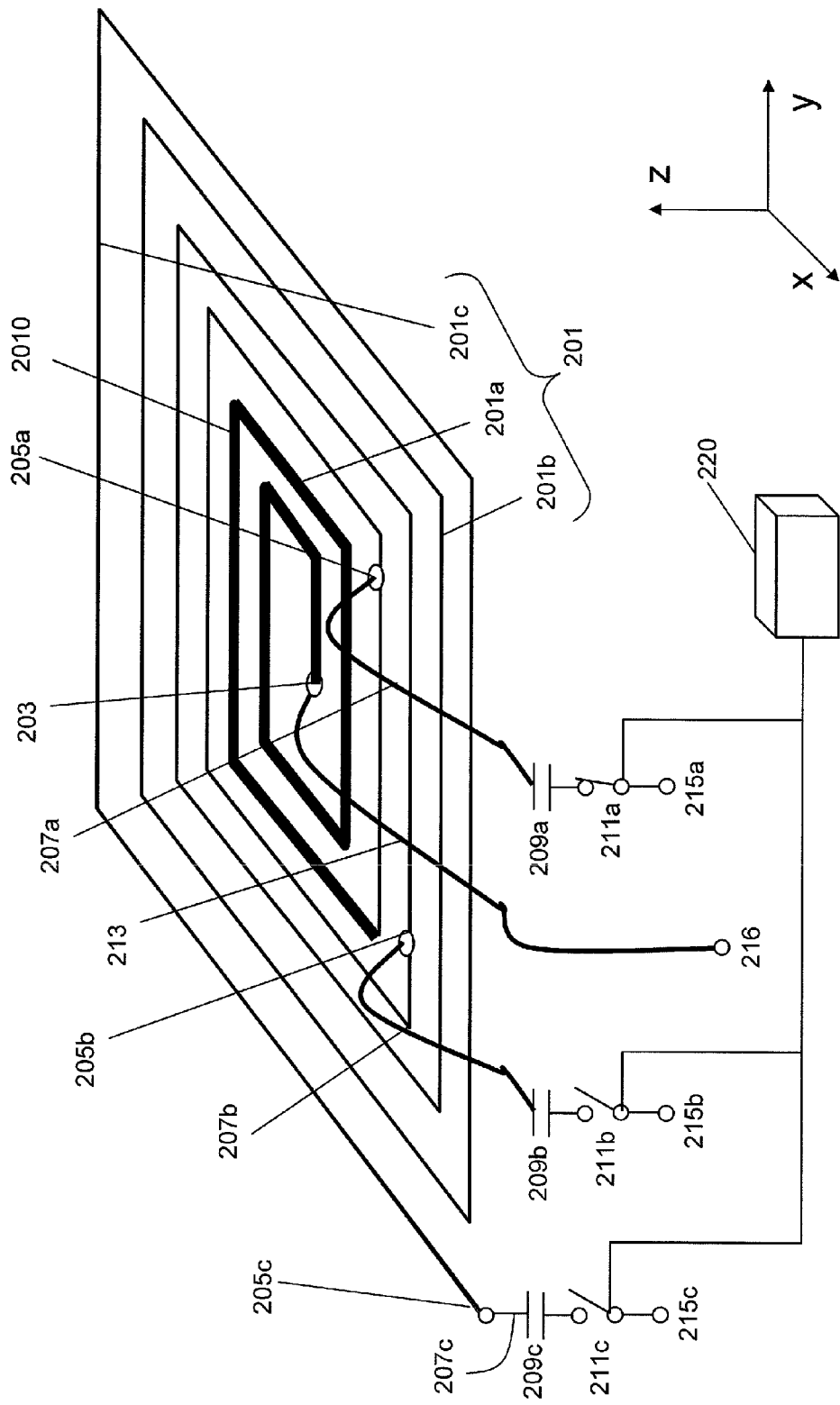
FIG. 3 is a perspective view schematically illustrating a series resonant circuit according to the first preferred embodiment.

The variable resonant circuit shown in FIG. 3 includes an inductor with a plurality of extended wires, a group of switches for selectively connecting one of those extended wires to an external power supplying structure, thereby changing the inductance, and a group of capacitors, which are designed to keep the resonant frequency constant in response to the change of inductance. In this variable resonant circuit, when power is transmitted, only a selected one of the switches is turned ON with the others kept OFF. Depending on which of those switches is selectively turned ON, a current path that connects the signal and ground sides of the inductor changes. Consequently, a resonant circuit with variable inductance and impedance is realized.

The wireless power transmission system includes an extended wire selecting section 220 for selecting an optimum switch among the group of switches. The extended wire selecting section 220 selects a switch and turns it ON based on impedance value(s) of the power source and/or in the load. For example, the extended wire selecting section 220 is connected with at least one of the power source, the power transmitter 103, the poser receiver 109 and the load, and selects a switch to be turned ON based on their impedance values.

Hereinafter, the exemplary configuration shown in FIG. 3 will be described in further detail.

Specifically, the inductor shown in FIG. 3 includes wiring 201 with a rectangular spiral shape (which will be referred to herein as "spiral wiring") and four extended wires 213, 207a, 207b and 207c, which are connected to mutually different positions of the spiral wiring 201. The spiral wiring 201 shown in FIG. 3 is wound six times. However, the number of times of winding just needs to be at least two.

Figure 4:
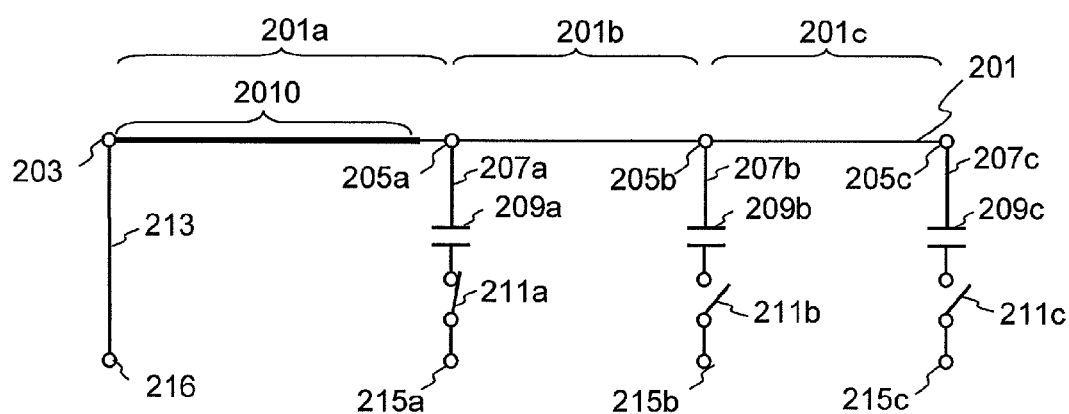
FIG. 4 schematically illustrates the configuration of the series resonant circuit shown in FIG. 3.

The spiral wiring 201 of this preferred embodiment is composed of three wiring portions 201a, 201b and 201c. In FIG. 4, illustrated is a version of the spiral wiring 201 that has been virtually straightened in order to show clearly where the extended wires 213, 207a, 207b and 207c are located with respect to the wiring portions 201a, 201b and 201c of the spiral wiring 201.

As can be seen most easily from FIG. 4, the wiring portion 201a covers a range of the spiral wiring 201 from a point 203 through a point 205a, the wiring portion 201b covers another range of the spiral wiring 201 from the point 205a through a point 205b, and the wiring portion 201c covers the rest of the spiral wiring 201 from the point 205b through a point 205c. It should be noted that such a "point" on the spiral wiring 201 to which an extended wire is connected does not have to be a point in a strict sense but may also be a plane that forms a contact portion with a finite area. And those points indicate the "positions" at which the respective extended wires are connected to the spiral wiring.

In FIGS. 3 and 4, some lines representing the wiring portion 201a are drawn bolder than the other lines indicating the other wiring portions. Those bolder lines representing the wiring portion 201a indicate a low-resistance portion 2010 in which the wiring resistance per unit length is lower than some other wiring portion at the resonant frequency f0. The wiring resistance depends on the signal frequency. The "wiring resistance", which is an important parameter according to the present invention, is a wiring resistance value measured at the resonant frequency f0. For that reason, in the following description, the "wiring resistance" will herein mean the "wiring resistance at the resonant frequency".

Figure 12:
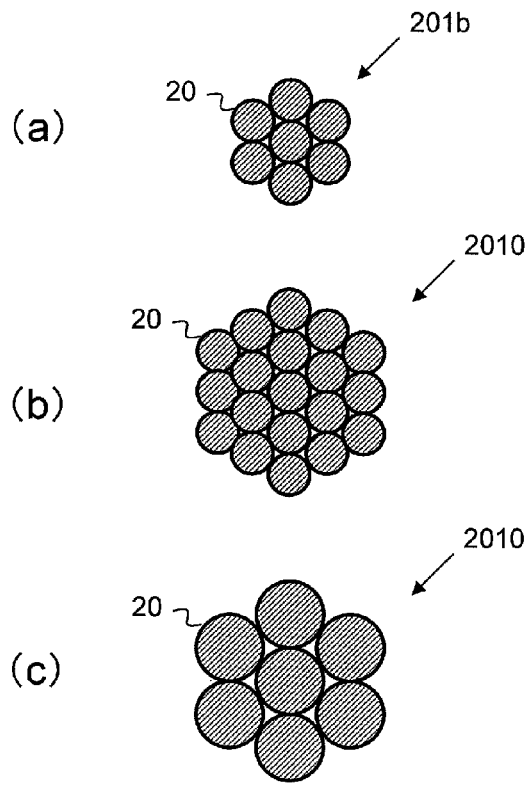
FIGS. 12(a), 12(b), 12(c), 13(a), 13(b) and 13(c) are cross-sectional views illustrating some examples of parallel wiring structures.

To make the wiring resistance per unit length lower in a particular portion on the spiral wiring than some other portion, it is effective to use a wiring material with high conductivity to make that particular portion or to adopt a parallel wiring structure in which a greater number of fine wires are arranged than that another portion. In the latter case, it is preferred that those fine wires that are arranged in parallel with each other be stranded together. FIGS. 12(a) through 12(c) are cross-sectional views illustrating examples of the parallel wiring structure as viewed perpendicularly to the longitudinal direction thereof. Specifically, FIG. 12(a) illustrates an exemplary cross section of the wiring portion 201b, while FIG. 12(b) illustrates an exemplary cross section of the low-resistance portion 2010 of the wiring portion 201a. In the low-resistance portion 2010, a greater number of fine wires 20 are arranged in parallel with each other than some other wiring portion (such as the wiring portion 201b). Alternatively, the low-resistance portion 2010 may also have fine wires 20 with a greater diameter than some other portion without changing the number of fine wires 20 that are arranged in parallel with each other as shown in FIG. 12(c).

Figure 13:
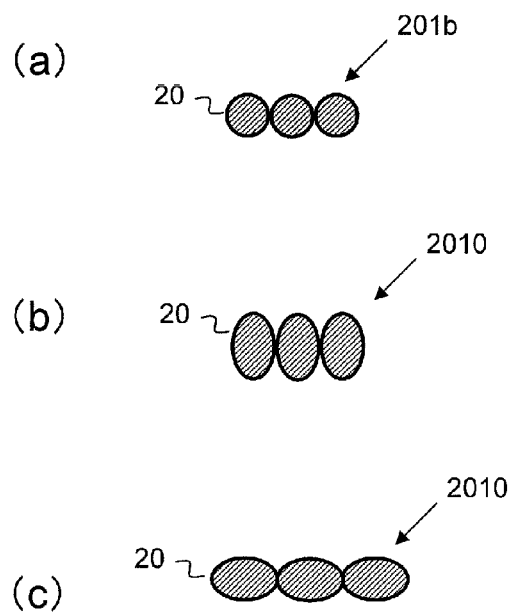

FIG. 13 illustrates other exemplary cross sections of the parallel wiring structure. Specifically, FIG. 13(a) illustrates an exemplary cross section of the wiring portion 201b, while FIGS. 13(b) and 13(c) illustrate exemplary cross sections of the low-resistance portion 2010 of the wiring portion 201a. In the low-resistance portion 2010 shown in FIG. 13(b), the fine wires 20 are made thicker than elsewhere without changing the number of the fine wires 20 that are arranged in parallel with each other. On the other hand, in the low-resistance portion 2010 shown in FIG. 13(c), the fine wires 20 are made wider than elsewhere without changing the number of the fine wires 20 that are arranged in parallel with each other. In any case, in the low-resistance portion 2010, at least one fine wire needs to have a greater diameter, thickness or width than elsewhere.

The spiral wiring 201 may have either a substantially constant resistance value, or varying resistance values, per unit length except the low-resistance portion 2010 (as indicated by the bold lines) of the wiring portion 201a. The point is to provide a resonator that operates, when the inductance value is the lowest, with sufficiently high efficiency and lower impedance than in a situation where a different inductance value is selected.

In this preferred embodiment, only one extended wire 213 is provided for the signal side but multiple extended wires 207a, 207b and 207c are provided for the ground side. As will be described in detail later, by choosing one of those extended wires 207a, 207b and 207c on the ground side, the inductance can be changed. Although the total number of extended wires provided for the signal and ground sides is four in this preferred embodiment, any other number of extended wires may also be provided as long as the number is at least three.

In the example illustrated in FIG. 3, the extended wire on the signal side, namely the first extended wire 213, is directly connected to the point 203 that is the inner end of the spiral wiring 201. On the other hand, the group of extended wires on the ground side, namely the second through fourth extended wires 207a, 207b and 207c, are respectively connected to mutually different points 205a, 205b and 205c of the spiral wiring. Those points 203 and 205c do not always have to be the ends of the spiral wiring 201 at the same time. However, as there is no need to extend the spiral wiring 201 in vain, it is still preferred that both ends of the spiral wiring 201 be connected to the extended wires.

The first extended wire 213 is connected to an external circuit (such as the power transmitter 103 or power receiver 109 shown in FIG. 1 or a matching circuit, a filter circuit or any other circuit arranged around the power transmitter or receiver) via a terminal 216 so as to receive either the energy that has been supplied from the external device or the energy to be supplied to the external device. On the other hand, the second extended wire 207a is connected in series to a capacitor 209a, a conducting path selecting switch 211a and a terminal 215a. The third extended wire 207b is connected in series to a capacitor 209b, a conducting path selecting switch 211b and a terminal 215b. And the fourth extended wire 207c is connected in series to a capacitor 209c, a conducting path selecting switch 211c and a terminal 215c.

One of these extended wires 207a, 207b and 207c is connected to its associated terminal 215a, 215b or 215c via its associated conducting path selecting switch 211a, 211b or 211c that has been selectively turned ON. Each of these terminals 215a, 215b and 215c is also connected, along with the terminal 216, to the input or output terminal of the external device or circuit.

The capacitances of the capacitors 209a, 209b and 209c are set so that the series resonant circuit has a substantially same resonant frequency, no matter which of those switches has been selectively turned ON. Suppose the inductances to be produced by the extended wires 207a, 207b and 207c when selected are identified by La, Lb and Lc, respectively, and the capacitances of the capacitors 209a, 209b and 209c are identified by Ca, Cb and Cc, respectively. In that case, Ca, Cb and Cc are adjusted in advance so that a resonant circuit is formed at a frequency f0 no matter which of the three sets (La, Ca), (Lb, Cb) and (Lc, Cc) is selected.

In this manner, one of multiple different states in which the inductance and capacitance are balanced differently can be chosen with the same resonant frequency f0 maintained.

The resonant frequency f0 is defined to be equal to the frequency f0 of the electromagnetic energy to be transferred wirelessly. Strictly speaking, the system may use a resonator that produces resonances at a different frequency from the transmission frequency due to some variations caused during the manufacturing process. However, that difference is not made intentionally. Anyway, by switching from one of those multiple states in which the inductance and capacitance are balanced differently into another, a wireless transmission block with variable impedance characteristics can be provided for a wireless power transmission system of the resonant magnetic coupling type.

It should be noted that the capacitor 209a and the conducting path selecting switch 211a may be arranged in any order between the extended wire 207a and the terminal 215a, for example. In other words, the capacitor 209a and the conducting path selecting switch 211a may be arranged in reverse order. That is to say, the capacitor 209a may be connected to the terminal 215a and the conducting path selecting switch 211a may be connected to the extended wire 207a instead. The same can be said about any other set consisting of an extended wire, a capacitor, a switch and a terminal.

In the preferred embodiment described above, the low-resistance portion 2010 forms only part, not all, of the wiring portion 201a. However, this is just an example and the present invention is in no way limited to that specific preferred embodiment. That is to say, the low-resistance portion 2010 may be everything of the wiring portion 201a. In any case, by having the low-resistance portion 2010 form at least a part of the wiring portion 201a in this manner, the average wiring resistance over the entire wiring portion 201a can be lower than in another wiring portion 201b or 201c.

Optionally, another portion of the spiral wiring 201 other than the wiring portion 201a (i.e., the wiring portion 201b or 201c) may have such a low-resistance portion, of which the resistance is as low as that of the low-resistance portion 2010 of the wiring portion 201a. Even so, it is still preferred that the average wiring resistance over the entire wiring portion 201a be lower than in another wiring portion 201b or 201c.

As can be seen easily from the foregoing description, the spiral wiring 201 of this preferred embodiment includes a low-resistance portion 2010, in which the wiring resistance per unit length at the resonant frequency is set to be lower than at least part of the rest of the spiral wiring 201, in the range from the point 203 through the point 205a (i.e., in the wiring portion 201a). As a result, in that range from the point 203 through the point 205a, the spiral wiring 201 can have a lower average wiring resistance than outside of that range. It is most preferred that the low-resistance portion 2010 located in that range from the point 203 through the point 205a have a lower wiring resistance per unit length at the resonant frequency than anywhere else in the spiral wiring 201.

By adopting such an arrangement, even when a state that will result in the lowest inductance is selected, the resonator will still have lower impedance than in a situation where a different inductance value is selected.

Generally speaking, in a situation where a constant voltage circuit is driven, when a lot of power is supplied to the load, a lot of current will flow, thus making the impedance low. On the other hand, if wireless power transmission of the resonant magnetic coupling type is carried out by a series resonant circuit, a combination in which the resonator has small inductance and large capacitance is preferably adopted in order to lower the optimum impedance Zopt at the input and output terminals that would maximize the transmission efficiency.

In the example illustrated in FIG. 3, if the switch 211a is closed, the spiral wiring length that contributes to getting the resonance operation done becomes shorter, and the series resonant circuit will eventually have lower inductance, than in a situation where the switch 211b or 211c is closed. When such a state that will result in the lowest inductance is selected, the spiral wiring 201 includes a portion that has a lower wiring resistance than some other portion. As a result, the resonator can operate so as to achieve high transmission efficiency at lower impedance.

The maximum transmission efficiency when the transmission efficiency has peak impedance dependence is determined by the Q factor of a resonator, which in turn depends on the Q factors of an inductor and a capacitor that form the resonator. The smaller the turn number of an inductor, the smaller the Q factor of the inductor tends to be. That is to say, the lower the impedance at the time of transmission, the smaller the Q factor of the resonator and the lower the efficiency of the wireless power transmission section will be in a variable resonator that selects the low-inductance state. To increase the Q factor of an inductor, it is effective to reduce the resistance value per unit length of the inductor's wire. However, it is not a practical measure to take to design an inductor structure so that the resistance value is low over the entire wiring. That is to say, if the entire wiring were replaced with a high-conductivity one or if the entire wiring were implemented as a parallel wiring structure in which a large number of wires are arranged in parallel with each other, then the overall length of wiring used would increase so much as to increase the weight, cost and on-chip area significantly.

According to this preferred embodiment, when low inductance is selected, the wiring path of the resonator is defined to be the path between the points 203 and 205a. On the other hand, when high inductance is selected, the wiring path of the resonator is a longer path including either the wiring portion that runs from the point 205a through the point 205b or the wiring portion that runs from the point 205a through the point 205c. That wiring portion that runs from the point 205a through the point 205b can form a spiral wiring path when either the switch 211b or the switch 211c is turned ON. However, the wiring portion that runs from the point 205b through the point 205c can form a spiral wiring path only when the switch 211c is turned ON.

According to this preferred embodiment, at least part of the wiring portion that forms a path when the low inductance is selected has a lower resistance value per unit length at the wireless power transmission frequency f0 than the wiring portions (including the wiring portion that runs from the point 205a through the point 205b and the wiring portion that runs from the point 205b through the point 205c) that form a path only when the high inductance is selected.

By adopting such an arrangement, the decrease in the Q factor of the variable resonator can be avoided in the state to be selected when transmission is carried out with low impedance. According to this preferred embodiment, it is possible to design the system so as to reduce the deterioration in transmission efficiency more effectively as the power to be transmitted increases and as the transmission efficiency required gets higher. In addition, it is also possible to avoid increasing the overall length of wiring used.

It should be noted that the amounts of current flowing through the respective switches 211a, 211b and 211c are different from each other. For that reason, it is preferred that the size and property of each of these switches be determined appropriately according to the amount of current that is expected to flow through that switch. For example, a switch through which a larger amount of current should flow preferably has a greater rating than a switch through which a smaller amount of current should flow. Also, a switch through which a larger amount of current should flow is preferably implemented as a semiconductor device that has a wider gate width than a switch through which a smaller amount of current should flow.

How to Stop Operating Variable Resonator

Figure 5:
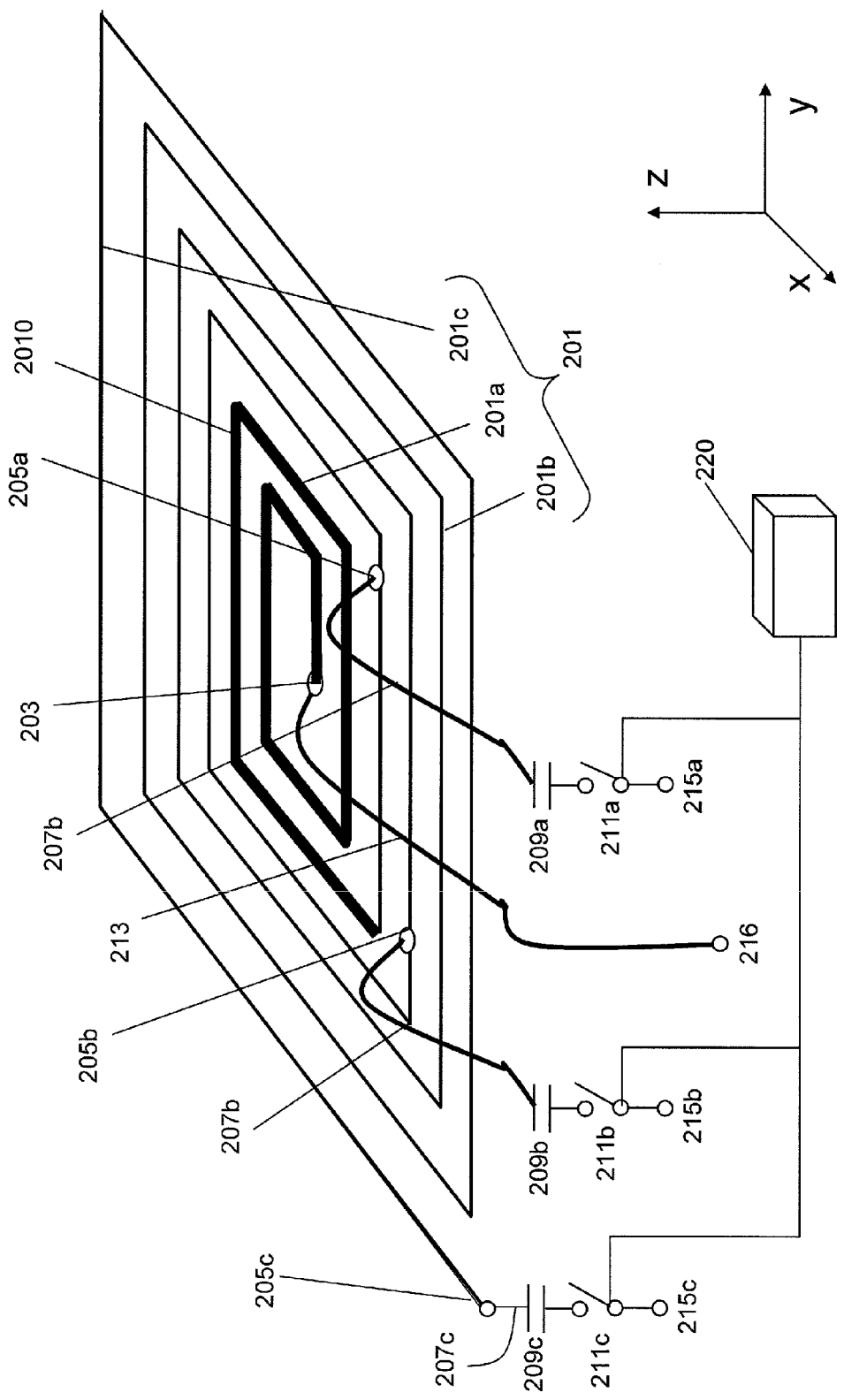
FIGS. 5 and 6 are perspective views schematically illustrating two different states of the wireless power transmission system of the first preferred embodiment of the present invention.
Figure 6:
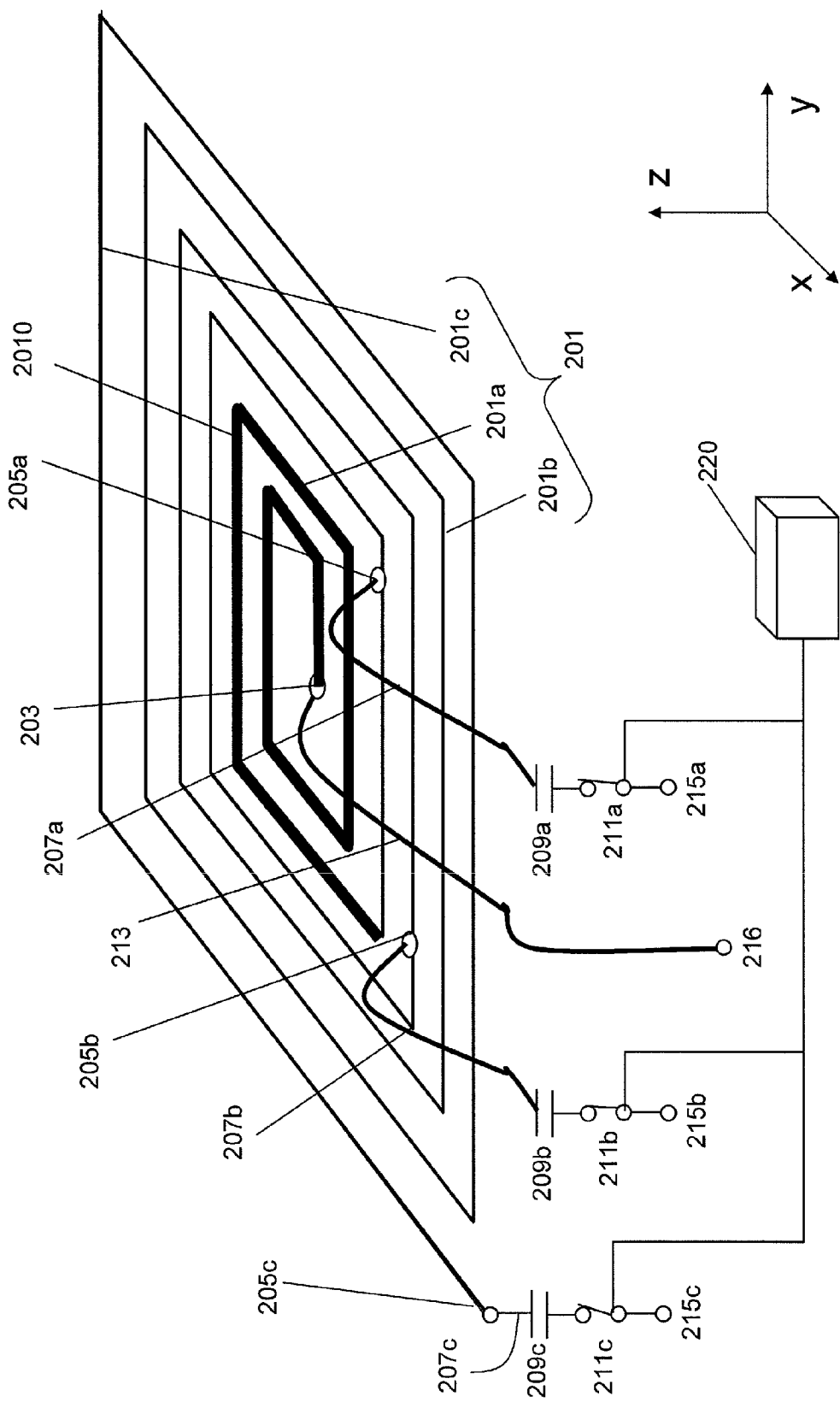

When the wireless power transmission system of the present invention should stop its charging and power supplying operation, the resonant frequency fr of the variable resonator may be changed into a different value from the frequency f0 of the electromagnetic energy being transmitted. To realize such a state, every conducting path selecting switch may be opened as shown in FIG. 5. Alternatively, the resonant frequency may also be changed from f0 by controlling the conductive states of multiple conducting path selecting switches as shown in FIG. 6.

Figure 7:
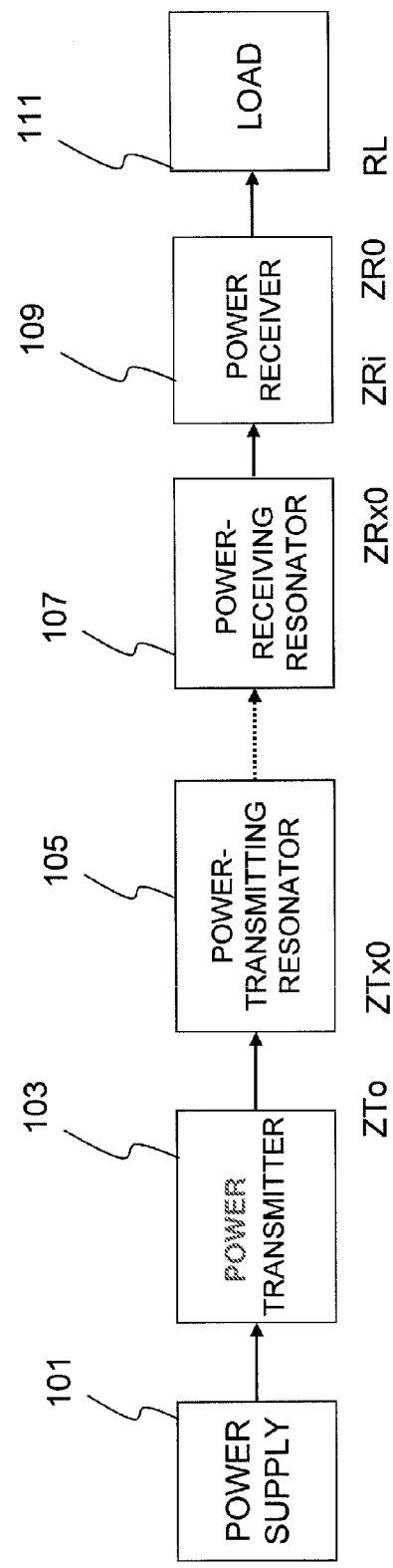
FIG. 7 illustrates how to get impedance matching done in the wireless power transmission system of the present invention.

FIG. 7 illustrates how to get impedance matching done in the wireless power transmission system of the present invention. It should be noted that functional blocks for performing a feedback control and other functional blocks are omitted from FIG. 7. Although not shown, circuit blocks that realize those functions are actually added as needed.

Matching Condition #1: the system is designed so that the output impedance ZTo of the power transmitter 103 and the optimum input impedance ZTx0 of the power-transmitting resonator are matched to each other. If this condition is satisfied, reflection of the energy due to an impedance mismatch between the power transmitter 103 and the power-transmitting resonator 105 can be reduced.

Matching Condition #2: the system is designed so that the optimum output impedance ZRx0 of the power-receiving resonator 107 and the input impedance ZRi of the power receiver 109 are matched to each other. If this condition is satisfied, reflection of the energy due to an impedance mismatch between the power-receiving resonator 107 and the power receiver 109 can be reduced.

Matching condition #3: the system is designed so that the output impedance ZRo of the power receiver 109 that has operated with the input impedance ZRi is matched to the load impedance RL of the load 111. If this condition is satisfied, reflection of the energy due to an impedance mismatch between the power receiver 109 and the load 111 can be reduced.

If all of these two Matching Conditions are satisfied at the same time, the transmission efficiency can be maximized.

Number of Power-Transmitting Resonator(s) and Number of Power-Receiving Resonator(s)

Neither the number of power-transmitting resonator(s) included in the transmission system nor that of power-receiving resonator(s) included there has to be one.

Specific Configurations of Circuit Elements

In the power-transmitting resonator and power-receiving resonator, the capacitors 209a, 209b and 209c may be implemented as a lumped constant circuit element with an MIM structure formed by semiconductor device processing. Examples of those lumped constant circuit elements include a chip capacitor, a ceramic capacitor, a tantalum electrolytic capacitor, an aluminum electrolytic capacitor, a mica capacitor, an electric double layer capacitor, and a vacuum capacitor. Also, the capacitance value of each of these lumped constant circuit elements may be determined with the value of the parasitic capacitance distributed on the wiring taken into account.

The inductor circuit that functions as the power-transmitting resonator 105 and the power-receiving resonator 107 does not always have to have rectangular spiral wiring. Alternatively, the spiral wiring may also have an elliptical shape or any other asymmetric shape. If such a rectangular spiral shape is adopted, its corner portions preferably have a predetermined radius of curvature or more. This is because a wiring shape that does not have any portion of which the angle changes acutely can contribute to avoiding overconcentration of RF current or magnetic field density in the surrounding space, thus increasing the transmission efficiency quite a bit.

The spiral wiring that forms the variable resonator of the present invention does not always have to have a planar single-layer structure but may also have a multilayer structure as well.

Embodiment 2

Hereinafter, a second preferred embodiment of a wireless power transmission system according to the present invention will be described with reference to FIG. 8. The only difference between this second preferred embodiment and the first preferred embodiment described above is the arrangement of the impedance variable series resonant circuit. That is why the following description of this second preferred embodiment will be focused on the arrangement of the series resonant circuit and description of the other arrangements will be omitted herein to avoid redundancies.

In the preferred embodiment illustrated in FIG. 3, the signal-side extended wire 213 to be directly connected to the external terminal 216 is connected to a terminal inside the spiral of the spiral wiring 201. On the other hand, according to this second preferred embodiment, the signal-side extended wire 213 is connected to a terminal that is located outside of the spiral of the spiral wiring 201 as shown in FIG. 8.

According to this preferred embodiment, when the switch 211a is selectively turned ON, the system will operate with the lowest inductance. That is why at least a part of the wiring portion 201a that runs from the point 203 through the point 205a has a lower resistance value per unit length at the transmission frequency f0 than in some other portion (such as the wiring portion 201b that runs from the point 205a through the point 205b or the wiring portion 201c that runs from the point 205b through the point 205c). Even with the arrangement of this preferred embodiment adopted, the same effects as those of the series resonant circuit of the first preferred embodiment described above can also be achieved.

Still, the wiring resistance inside of the spiral in which the current density and magnetic field density tend to be excessively high can be reduced more dramatically by increasing the Q factor of the inductor. That is why the arrangement shown in FIG. 3 is still preferred to the one shown in FIG. 8. Also, if the arrangement shown in FIG. 3 is adopted, it is preferred that the low-resistance portion 2010 be arranged in practice in the innermost portion of the spiral structure for the same reason.

Embodiment 3

Figure 9:
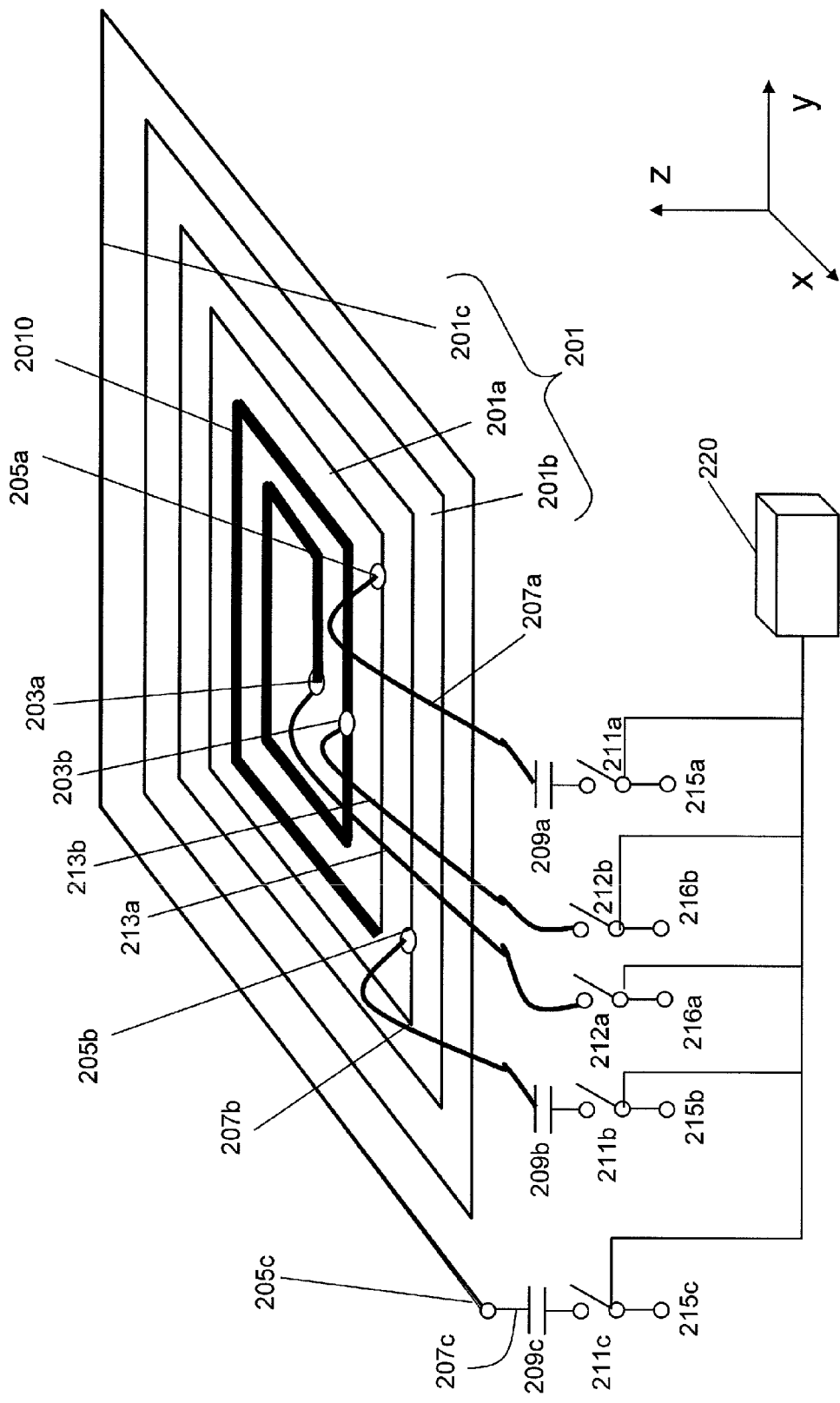

Hereinafter, a third preferred embodiment of a wireless power transmission system according to the present invention will be described with reference to FIG. 9. The only difference between this third preferred embodiment and the preferred embodiments described above is the arrangement of the impedance variable series resonant circuit. That is why the following description of this third preferred embodiment will be focused on the arrangement of the series resonant circuit and description of the other arrangements will be omitted herein to avoid redundancies.

Figure 8:
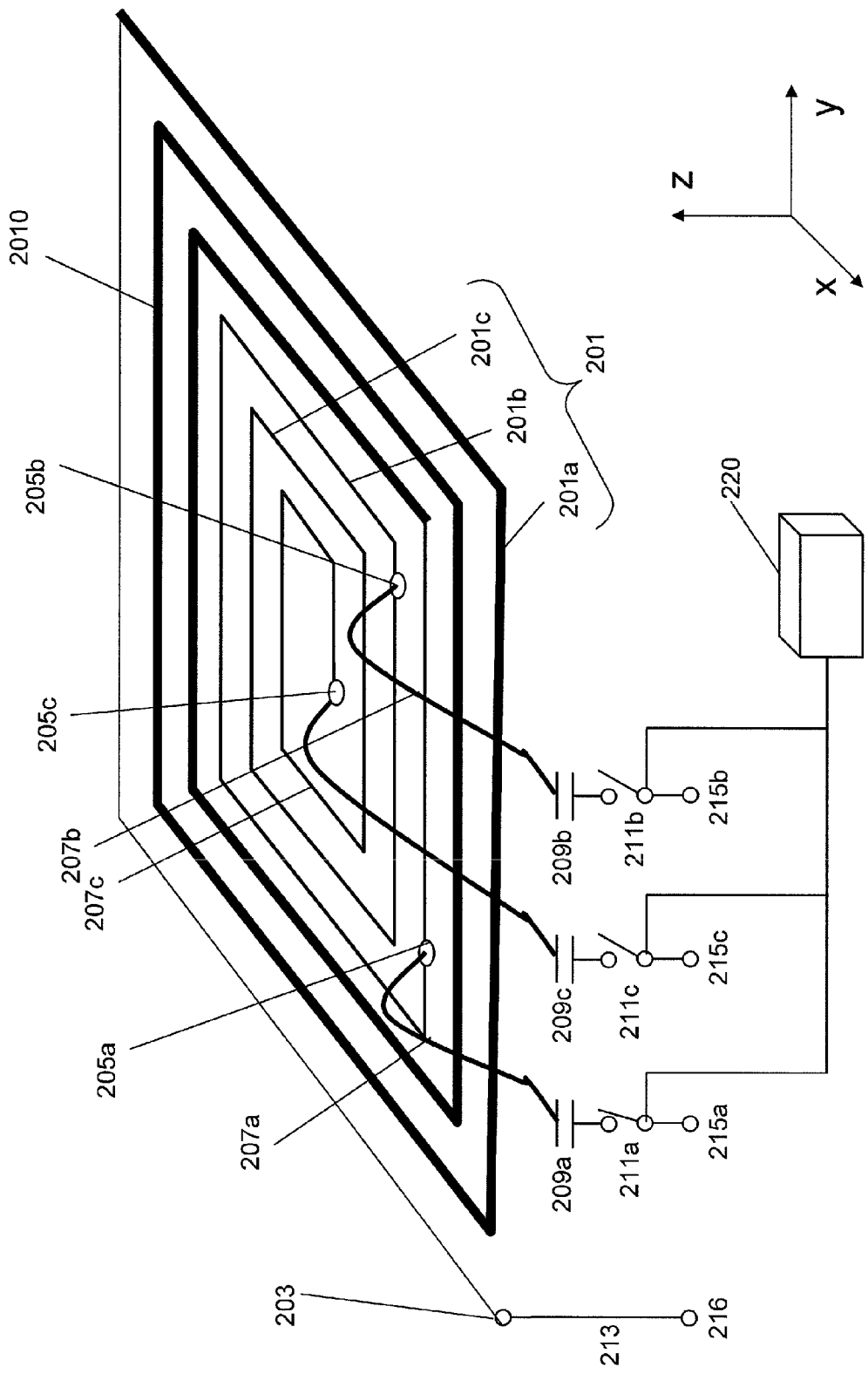
FIGS. 8 and 9 are perspective views schematically illustrating respective wireless power transmission systems as second and third preferred embodiments of the present invention.

In the variable resonators shown in FIGS. 3 and 8, switching circuits that make any one of the current paths selectable are provided for only the ground-side extended wires. On the other hand, according to this third preferred embodiment, another switching circuit is also provided for the signal-side extended wire as shown in FIG. 9. Specifically, two signal input terminals 216a and 216b are selectively connected to two extension points 203a and 203b. That is to say, the extended wire 213a connected to the extension point 203a is connected to a terminal 216a via the switch 212a. On the other hand, the extended wire 213b connected to the extension point 203b is connected to a terminal 216b via the switch 212b. And one of these two switches 212a and 212b is selectively turned ON.

Supposing the number of the extended wires 213a, 213b, etc., on the signal input side is M and the number of extended wires 207a, 208b, on the ground side is N, at most M×N variable inductances can be obtained.

Optionally, a capacitor may be inserted into the path leading from the extension point 203a or 203b to the external terminal 216a or 216b. In that case, however, the number of ON-state switches while the resonator is operating becomes two. On the other hand, if there is only one extended wire 213 on the input side as in the arrangement shown in FIG. 3, the number of conducting path selecting switches to be selectively turned ON while the resonator is operating can be cut down to one. That is to say, according to the arrangement shown in FIG. 3, the switch conduction loss in the resonator can be halved compared to the arrangement shown in FIG. 9 and the transmission efficiency can be increased as a result.

In the preferred embodiments described above, the path to be selected in the lowest impedance state (i.e., a state in which the largest amount of current flows provided that a constant-voltage operation is supposed to be performed) includes a part that has a lower wiring resistance than some other portion. However, the present invention is in no way limited to those specific preferred embodiments. Alternatively, at least some path of the wiring portion to be used most frequently or the wiring portion to be used for longest hours may have a part with a lower wiring resistance (i.e., the low-resistance portion 2010) than at least some other portion.

Figure 10:
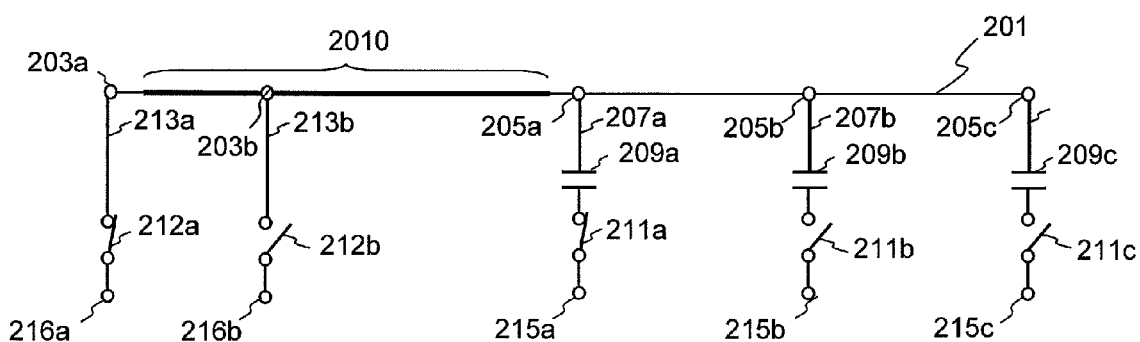
FIGS. 10 and 11 illustrate versions of the spiral wiring that have been virtually straightened to represent other preferred embodiments of the present invention.
Figure 11:
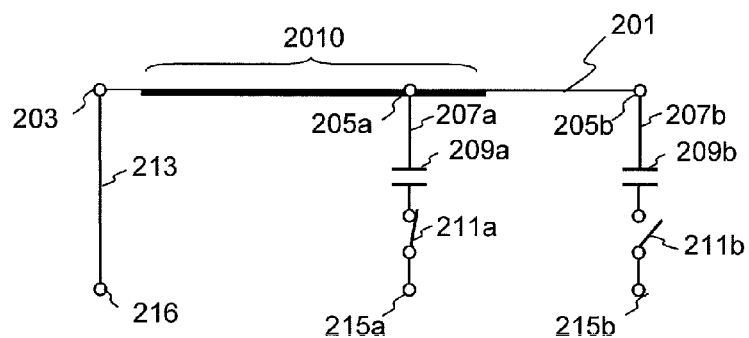

In FIGS. 10 and 11, illustrated are versions of the spiral wiring 201 that have been virtually straightened to represent other preferred embodiments of the present invention. The spiral wiring 201 shown in FIG. 10 also has a low-resistance portion 2010, which has a lower wiring resistance per unit length at the resonant frequency than at least part of the other range of the spiral wiring 201, in the range from the point 203b through the point 205a. In this example, however, the low-resistance portion 2010 also covers a part of the range between the points 203a and 203b.

The spiral wiring 201 shown in FIG. 11 also has a low-resistance portion 2010, which has a lower wiring resistance per unit length at the resonant frequency than at least part of the other range of the spiral wiring 201, in the range from the point 203 through the point 205a. In this example, however, the low-resistance portion 2010 also covers a part of the range between the points 205a and 205b.

EXAMPLES

To demonstrate the beneficial effects of the present invention, a variable resonator with the arrangement shown in FIG. 3 was fabricated. Specifically, a specific example of the present invention and comparative examples having the parameters shown in the following Table 1 were made in the following manner.

First of all, spiral wiring (inductor wiring) was formed so as to have a rectangular shape, a longer side length a of 30 cm, a shorter side length b of 16 cm, a wire-to-wire interval of 1 cm, and the maximum turn number of 6. In order to reduce the conductor loss of the resonator, the spiral wiring was formed as a Litz wire consisting of copper wires that had a diameter of 120 μm and that were arranged in parallel with each other. The wiring resistance per unit length of the spiral wiring varied according to the number of parallel copper wires that formed the Litz wire. In Example #1, the spiral wiring was made up of a wiring portion consisting of 60 parallel wires, another wiring portion consisting of 150 parallel wires, and still another wiring portion consisting of 250 parallel wires. In Comparative Example #1a on the other hand, the overall spiral wiring was made up of 60 parallel wires. And in Comparative Example #1b, the overall spiral wiring was made up of 250 parallel wires.

In any of these variable resonators, the innermost end of the spiral wiring was defined to be the point 203, which was connected to the signal line of an external circuit with an extended wire 213. Also, a branching point 205a was set at a point where the turn number was two as measured from the innermost end of the spiral. Another branching point 205b was set at a point where the turn number was four as measured from the innermost end of the spiral. And a point 205c was set at the outermost end of the spiral (where the turn number was six). Extended wires 207a, 207b and 207c were not only connected to those points 205a, 205b and 205c, respectively, but also connected to load switches 211a, 211b and 211c by way of capacitors 209a, 209b and 209c, respectively.

In Example #1, a portion of the spiral wiring running from one end 203 through the branching point 205a was made up of 250 parallel wires and had the lowest wiring resistance. Another portion of the spiral wiring running from the branching point 205a through the branching point 205b was made up of 150 parallel wires. And the other portion of the spiral wiring running from the branching point 205b through the other end 205c was made up of 60 parallel wires and had the highest wiring resistance.

In Comparative Example #1a, on the other hand, the entire spiral wiring (i.e., from one end 203 through the other end 205a thereof) was made up of 60 parallel wires. Furthermore, in Comparative Example #1b, the entire spiral wiring (i.e., from one end 203 through the other end 205a thereof) was made up of 250 parallel wires.

Each of the load switches 211a, 211b and 211c was a MOSFET with an ON-state resistance of 30 mΩ. All of these load switches 211a, 211b and 211c were connected to the GND of the input/output terminal of the external circuit. If one of these load switches 211a, 211b and 211c was turned ON, one of the three paths running from the point 203 through the point 215a, 215b or 215c of the spiral wiring 201 was selected so that the inductance could be varied.

The capacitances of the capacitors 209a, 209b and 209c were set so that the series resonant circuit had a resonant frequency of 1.8 MHz, no matter which of these three load switches 211a, 211b and 211c was selectively turned ON. Specifically, the capacitors 209a, 209b and 209c had capacitances of 3640 pF (picofarads), 1070 pF and 500 pF, respectively.

When transmission was carried out with low impedance, the switch 211a was selected and the inductor with a turn number of two contributed to producing resonances. On the other hand, when transmission was carried out with high impedance, the switch 211c was selected and the inductor with a turn number of six contributed to producing resonances. And when transmission was carried out with medium impedance, the switch 211b was selected and the inductor with a turn number of four contributed to producing resonances.

For each of Example #1 and Comparative Examples #1a and #1b, two resonators that had Litz wires consisting of mutually different numbers of parallel wires as shown in the following Table 1 were provided and their Q factors were measured as an index representing how low the loss caused by the resonator would be.

Also, two resonators that had been made on the same condition were arranged as a pair of power-transmitting and power-receiving resonators so as to be spaced by 20 cm from each other parallel to the plane on which the inductors had been formed. Also, the input/output terminals of both of their antennas were connected to a network analyzer to evaluate their pass/reflection characteristics with a small signal input. In this manner, the optimum impedance value that would maximize the transmission efficiency between the antennas and the maximum transmission efficiency were measured. Next, the quantities of heat generated at the power-transmitting and power-receiving antennas when an energy of 50 W was supplied to the power-transmitting antenna and received at the power-receiving antenna were measured.

The following Table 1 summarizes the configurations and transmission characteristics of Example #1 and Comparative Examples #1a and #1b and the quantities of heat generated by them when 50 W was transmitted. Table 1 also shows the relative wiring lengths that Example #1 and Comparative Examples #1a and #1b needed when the overall length of wiring used by Comparative Example #1a was 100.

TABLE 1

|  |  | Example 1 | Comparative Example 1a | Comparative Example 1b |
|---|---|---|---|---|
| Total turn number |  |  | 6 |  |
| Are parallel fine wires arranged asymmetrically (number of parallel wires)? |  | YES 60/150/250 | NO 60 everywhere | NO 250 everywhere |
| Turn number = 2 | Q factor | 1021 | 550 | 1120 |
|  | Transmission efficiency | 97.8% | 82.0% | 98.3% |
|  | Loss caused | 1.32 W | 10.8 W | 1.0 W |
| Turn number = 6 | Q factor | 1886 | 1530 | 2504 |
|  | Transmission efficiency | 99.3% | 98.6% | 99.5% |
|  | Loss caused | 0.08 W | 0.17 W | 0.06 W |
| overall length of wiring used |  | 204 | 100 | 333 |

As can be seen from Table 1, in Comparative Example #1a, the loss caused when transmission was done with low impedance (i.e., when the switch 211a was selected and the turn number was two) was 63 times as much as the loss caused when transmission was done with high impedance (i.e., when the switch 211c was selected and the turn number was six). Thus, improvement had to be made to use it actually.

In Example #1, on the other hand, particularly when transmission was done with low impedance, the transmission efficiency could be increased significantly with respect to Comparative Example #1a. Specifically, the loss caused when transmission was done with low impedance decreased by as much as 87% compared to Comparative Example #1a, thus achieving very beneficial effects in practice. When transmission was done with high impedance, on the other hand, the loss decreased by 59%.

Comparative Example #1b achieved the highest transmission efficiency of all of these three examples. Nevertheless, the overall length of wiring used by Comparative Example #1b was 3.3 times as long as what was needed in Comparative Example #1a. On top of that, even though the overall length of wiring used in Comparative Example #1b had to be increased by 64% compared to Example #1, the loss caused by making transmission with low impedance could be cut down by only 25%. On the other hand, the loss caused by making transmission with high impedance could be cut down by 40% even in Comparative Example #1b. Nevertheless, it was also discovered that there was very little difference between the efficiency achieved by Comparative Example #1b and the one achieved by Example #1 or Comparative Example #1a.

These results reveal that according to the present invention, when a lot of power needs to be transmitted, the efficiency can be increased significantly with the overall length of wiring needed cut down significantly, which is an effect unique to this invention.

In Example #1, the extended wire was fixed at the innermost end of the spiral. For the purpose of comparison, Example #2, in which the extended wire was fixed at the outermost end of the spiral instead, was also made. In Example #2, the number of parallel wires that formed the Litz wire was changed in the order of 100, 60 and 30 every other winding from the outermost end of the spiral wiring, contrary to Example #1. According to Example #2, a Q factor of 861 was achieved at a turn number of two and a Q factor of 1811 was achieved at a turn number of six. The overall length of wiring required by Example #2 was 2.19 times as long as in Comparative Example #1a. According to this Example #2, the efficiency of using the wiring and the Q factors achieved were somewhat inferior to the ones achieved by Example #1. Nonetheless, these numbers also prove the beneficial effect of the present invention.

It should be noted that the wireless power transmission system of the present invention does not always have to be applied to such a system to be driven with a constant voltage.

The wireless power transmission system of the present invention is applicable to desktop and laptop computers and other kinds of office equipment and wall-mounted TV monitors, mobile AV devices and other kinds of audiovisual equipment. This wireless power transmission system can also be used to charge, and supply power to, not only hearing aids and healthcare equipment but also a running or parked car charging system for electric vehicles, electric motorcycles and mobile robots as well. The system of the present invention can find a wide variety of applications even in a system for collecting power from a solar cell or a fuel cell, a contact with a device in a DC power supplying system or a replacement for an AC outlet.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A wireless power transmission system for transmitting power over a resonant magnetic field, the system comprising a power-transmitting resonator and a power-receiving resonator,
   wherein at least one of the power-transmitting resonator and the power-receiving resonator is a series resonant circuit, and
   wherein the series resonant circuit includes:
   an inductor including spiral wiring and first, second and third extended wires, the first extended wire connecting a first connection point of the spiral wiring to a power supplying structure, the second extended wire connecting a second connection point of the spiral wiring, which is different from the first connection point, to the power supplying structure, the third extended wire connecting a third connection point of the spiral wiring, which is more distant from the first connection point than the second connection point is, to the power supplying structure;
   multiple switches, two of which are connected to the second and third extended wires, respectively; and
   multiple capacitors, each of which is connected in series to a corresponding one of the second and third extended wires by way of a corresponding one of the switches,
   wherein the series resonant circuit has an inductance varied according to which current path has been chosen by selectively turning ON one of the switches, and
   wherein the capacitances of the capacitors are defined so that the series resonant circuit has a substantially same resonant frequency irrespective of what switch has been turned ON selectively, and
   wherein the spiral wiring has a low-resistance portion, which is located in a range from the second connection point through the first connection point and of which the wiring resistance per unit length at the resonant frequency is set to be lower than in at least a part of the other range of the spiral wiring.

2. The wireless power transmission system of claim 1, wherein the low-resistance portion has lower wiring resistance per unit length at the resonant frequency than any other portion of the spiral wiring.

3. The wireless power transmission system of claim 1, wherein the spiral wiring has a lower average wiring resistance at the resonant frequency in the range from the second connection point through the first connection point than outside of that range.

4. The wireless power transmission system of claim 1, wherein the low-resistance portion of the spiral wiring has a structure in which a larger number of fine wires are arranged in parallel with each other than any other portion of the spiral wiring.

5. The wireless power transmission system of claim 1, wherein the low-resistance portion of the spiral wiring includes at least one fine wire that has a larger diameter than its counterpart in any other portion of the spiral wiring.

6. The wireless power transmission system of claim 1, wherein the low-resistance portion of the spiral wiring includes at least one fine wire that is thicker than its counterparts in any other portion of the spiral wiring.

7. The wireless power transmission system of claim 1, wherein the low-resistance portion of the spiral wiring includes at least one fine wire that is wider than its counterpart in any other portion of the spiral wiring.

8. The wireless power transmission system of claim 1, wherein the inductor further includes a fourth extended wire for connecting a fourth connection point, which is more distant from the second connection point of the spiral wiring than the first connection point is, to the power supplying structure, and
   wherein each of the first and fourth extended wires is selectively connected to the power supplying structure by way of a different switch from the multiple switches.

9. The wireless power transmission system of claim 1, wherein if the series resonant circuit has the lowest possible one of its variable inductances, a portion of the spiral wiring that forms a current path is the innermost part of the spiral structure.

10. The wireless power transmission system of claim 1, wherein either the rating of the multiple switches or the gate width of transistors that function as the switches has its value varied according to the amount of current that flows through the switches in ON state.

11. The wireless power transmission system of claim 10, wherein one of the multiple switches that allows a larger amount of current to flow in ON state has a greater rating or a wider transistor gate width than another one of the switches that allows a smaller amount of current to flow in ON state.

12. The wireless power transmission system of claim 1, wherein if the series resonant circuit does not contribute to power transfer, the resonant frequency is changed into a different value by controlling the multiple switches.

13. The wireless power transmission system of claim 1, wherein the series resonant circuit is prevented from contributing to power transfer by turning every one of the switches ON.

14. The wireless power transmission system of claim 1, wherein the series resonant circuit is prevented from contributing to power transfer by turning every one of the switches OFF.

15. The wireless power transmission system of claim 1, comprising a power transmitter for supplying power to the power-transmitting resonator through the power supplying structure,
   wherein the optimum input impedance of the power-transmitting resonator that maximizes transmission efficiency between the power-transmitting and power-receiving resonators is matched to the output impedance of the power transmitter.

16. The wireless power transmission system of claim 1, comprising a power receiver for receiving power from the power-receiving resonator through the power supplying structure,
   wherein the optimum output impedance of the power-receiving resonator that maximizes transmission efficiency between the power-transmitting and power-receiving resonators is matched to the input impedance of the power receiver.

17. The wireless power transmission system of claim 1, wherein the output impedance of the power receiver is matched to a load impedance.

18. The wireless power transmission system of claim 1, comprising an extended wire selecting section for selecting and turning ON one of the multiple switches.

19. The wireless power transmission system of claim 18, comprising a power transmitter for supplying power to the power-transmitting resonator through the power supplying structure, and a power receiver for receiving power from the power-receiving resonator through the power supplying structure, wherein the extended wire selecting section selects and turns ON one of the multiple switches based on at least one of an output impedance of the power transmitter, an input impedance of the power receiver and a load impedance.

20. A wireless power transmission unit comprising one of a power-transmitting resonator and a power-receiving resonator and transmitting or receiving power to/from the other resonator over a resonant magnetic field,
- wherein the unit comprises a series resonant circuit that functions as the power-transmitting resonator or the power-receiving resonator, and
- wherein the series resonant circuit includes:
- an inductor including spiral wiring and first, second and third extended wires, the first extended wire connecting a first connection point of the spiral wiring to a power supplying structure, the second extended wire connecting a second connection point of the spiral wiring, which is different from the first connection point, to the power supplying structure, the third extended wire connecting a third connection point of the spiral wiring, which is more distant from the first connection point than the second connection point is, to the power supplying structure;
- multiple switches, two of which are connected to the second and third extended wires, respectively; and
- multiple capacitors, each of which is connected in series to a corresponding one of the second and third extended wires by way of a corresponding one of the switches,
- wherein the series resonant circuit has its inductance varied according to which current path has been chosen by selectively turning ON one of the switches, and
- wherein the capacitances of the capacitors are defined so that the series resonant circuit has a substantially same resonant frequency irrespective of what switch has been turned ON selectively, and
- wherein the spiral wiring has a low-resistance portion, which is located in a range from the second connection point through the first connection point and of which the wiring resistance per unit length at the resonant frequency is set to be lower than in at least a part of the other range of the spiral wiring.

* * * * *